United States Patent
Healey et al.

(10) Patent No.: US 9,610,949 B2
(45) Date of Patent: Apr. 4, 2017

(54) INDIVIDUAL DRIVING PREFERENCE ADAPTED COMPUTERIZED ASSIST OR AUTONOMOUS DRIVING OF VEHICLES

(71) Applicant: INTEL CORPORATION, Santa Clara, CA (US)

(72) Inventors: Jennifer A. Healey, San Jose, CA (US); Alexandra C. Zafiroglu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 23 days.

(21) Appl. No.: 14/364,658

(22) PCT Filed: Dec. 11, 2013

(86) PCT No.: PCT/US2013/074459
§ 371 (c)(1),
(2) Date: Jun. 11, 2014

(87) PCT Pub. No.: WO2015/088522
PCT Pub. Date: Jun. 18, 2015

(65) Prior Publication Data
US 2015/0158486 A1 Jun. 11, 2015

(51) Int. Cl.
*B60W 50/08* (2012.01)
*B60W 40/08* (2012.01)
(Continued)

(52) U.S. Cl.
CPC ............ *B60W 30/16* (2013.01); *B60W 30/12* (2013.01); *B60W 50/082* (2013.01);
(Continued)

(58) Field of Classification Search
CPC .... B60W 30/00; B60W 30/16; B60W 30/182; B60W 40/08; B60W 40/09;
(Continued)

(56) References Cited

U.S. PATENT DOCUMENTS 5,375,060 A * 12/1994 Nocker .............. B60K 31/0008
180/169
6,449,572 B1 * 9/2002 Kurz ................... B60R 16/0231
702/92
(Continued)

FOREIGN PATENT DOCUMENTS

| JP | 03-280110 A | 12/1991 |
|---|---|---|
| KR | 10-2012-007601 A | 7/2012 |
| WO | WO 2009-088437 A1 | 7/2009 |

OTHER PUBLICATIONS

International Search Report and Written Opinion mailed Sep. 9, 2014 for International Application No. PCT/US2013/074459, 13 pages.
(Continued)

*Primary Examiner* — Dale Moyer
(74) *Attorney, Agent, or Firm* — Schwabe, Williamson & Wyatt, P.C.

(57) ABSTRACT

Apparatuses, methods and storage medium associated with computerized assist or autonomous driving (CA/AD) of vehicles are disclosed herein. In various embodiments, an apparatus may include a CA/AD system to: receive an identifier identifying a driver/passenger of a vehicle; request or retrieve, using the identifier, individual driving preferences of the driver/passenger; and apply the individual driving preferences of the driver/passenger to policies for CA/AD of the vehicle, to customize the policies for CA/AD of the vehicle for the driver/passenger. The CA/AD system may further receive data for policy parameters of the customized policies; and CA/AD the vehicle, in a manner that is adapted for the individual, in accordance with the customized policies, based at least in part on the data for the policy parameters of the customized policies. Other embodiments may be described and claimed.

23 Claims, 8 Drawing Sheets

(51) Int. Cl.
*B60W 30/16* (2012.01)
*B60W 30/12* (2006.01)
*B60W 50/00* (2006.01)

(52) U.S. Cl.
CPC .............. *B60W 2050/0075* (2013.01); *B60W 2050/0089* (2013.01); *B60W 2540/28* (2013.01); *B60W 2550/22* (2013.01); *B60W 2550/402* (2013.01)

(58) Field of Classification Search
CPC .... B60W 50/08; B60W 50/085; B60W 50/10; B60W 2530/14; B60W 2050/0089; B60W 2050/0062; B60W 2050/0075; B60W 2540/28; B60W 2540/30; B60W 2550/308; B60W 2750/308
See application file for complete search history.

(56) References Cited

U.S. PATENT DOCUMENTS

| | | | | |
|---|---|---|---|---|
| 8,634,980 B1* | 1/2014 | Urmson | ............... | G05D 1/0214 701/23 |
| 9,134,731 B2* | 9/2015 | Healey | ................. | G05D 1/0088 |
| 2009/0171548 A1* | 7/2009 | Hyde | .................... | F02D 41/021 701/102 |
| 2009/0171549 A1* | 7/2009 | Hyde | ........................ | F01N 9/00 701/102 |
| 2009/0171555 A1* | 7/2009 | Hyde | .................... | F02D 41/021 701/115 |
| 2010/0023223 A1* | 1/2010 | Huang | ................. | B60W 40/09 701/44 |
| 2010/0087987 A1* | 4/2010 | Huang | ................. | B60W 40/08 701/36 |
| 2011/0106381 A1* | 5/2011 | Filev | ..................... | B60W 50/08 701/40 |
| 2011/0118929 A1* | 5/2011 | Takae | .................... | B60W 50/16 701/31.4 |
| 2011/0238457 A1 | 9/2011 | Mason et al. | | |
| 2012/0215415 A1* | 8/2012 | Schramm | ............ | B60W 30/143 701/93 |
| 2012/0310465 A1 | 12/2012 | Boatright et al. | | |
| 2013/0054049 A1* | 2/2013 | Uno | ....................... | B60W 40/08 701/1 |
| 2013/0253797 A1* | 9/2013 | McNew | .............. | G06N 99/005 701/98 |
| 2013/0274958 A1* | 10/2013 | Uno | ...................... | B60W 20/00 701/1 |
| 2014/0236386 A1* | 8/2014 | Yoshizawa | ............ | B60W 30/08 701/1 |
| 2014/0371981 A1* | 12/2014 | Nordbruch | ............ | G07C 5/0841 701/36 |
| 2015/0149017 A1* | 5/2015 | Attard | .................. | B60W 40/09 701/23 |
| 2015/0149023 A1* | 5/2015 | Attard | .................. | B60W 50/10 701/28 |

OTHER PUBLICATIONS

International Preliminary Report on Patentability mailed Jun. 23, 2016 for International Application No. PCT/US2013/074459, 10 pages.

* cited by examiner

Non-transitory computer-readable storage medium
802

Programming Instructions 804
configured to cause a device, in response to execution of the
programming instructions, to implement selected elements of Figure 1,
and/or practice (aspects of) method of Figures 2 - 3.

Figure 8

INDIVIDUAL DRIVING PREFERENCE ADAPTED COMPUTERIZED ASSIST OR AUTONOMOUS DRIVING OF VEHICLES

RELATED APPLICATION

Cross Reference to Related Application

This application is a national phase, under 35 U.S.C. 371, of PCT Application No. PCT/US2013/074459, filed Dec. 11, 2013, having the same title, and claims priority to the "074459" PCT application.

Technically, this and the parent application are related to PCT Application No. PCT/US2013/056207, filed Aug. 22, 2013, entitled "Locality Adapted Computerized Assisted or Autonomous Driving of Vehicles."

TECHNICAL FIELD

The present disclosure relates to the field of computerized assist or autonomous driving of vehicles, in particular, to apparatuses, methods and storage medium associated with generation and application of individual driving preferences to computerized advanced driver assist or autonomous driving of vehicles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Currently most computerized advanced driver assist or autonomous driving systems are designed to be deployed in the developed economy markets, such as the American, European or Japanese markets, where there are long histories of wide spread use of private motor vehicles and associated large population of experienced drivers, as well as strictly enforced codified traffic laws. These systems tend to mimic an idealized rule, following a risk averse driving style. Also, these systems typically do not provide a sense of customization particular to the owner, and gives the vehicles more of a generic feel—like a taxi instead of your own car. Further, there is a chance that large groups of autonomous driving vehicles could all respond exactly the same way to an emergent situation, or if the algorithms are known, "traps" could be set to cause the vehicles to react in an exactly known way, making the autonomous driving of vehicles vulnerable to malicious attackers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 8 illustrates an example storage medium with instructions configured to enable an apparatus to practice the present disclosure, in accordance with various embodiments.

DETAILED DESCRIPTION

Figure 1:
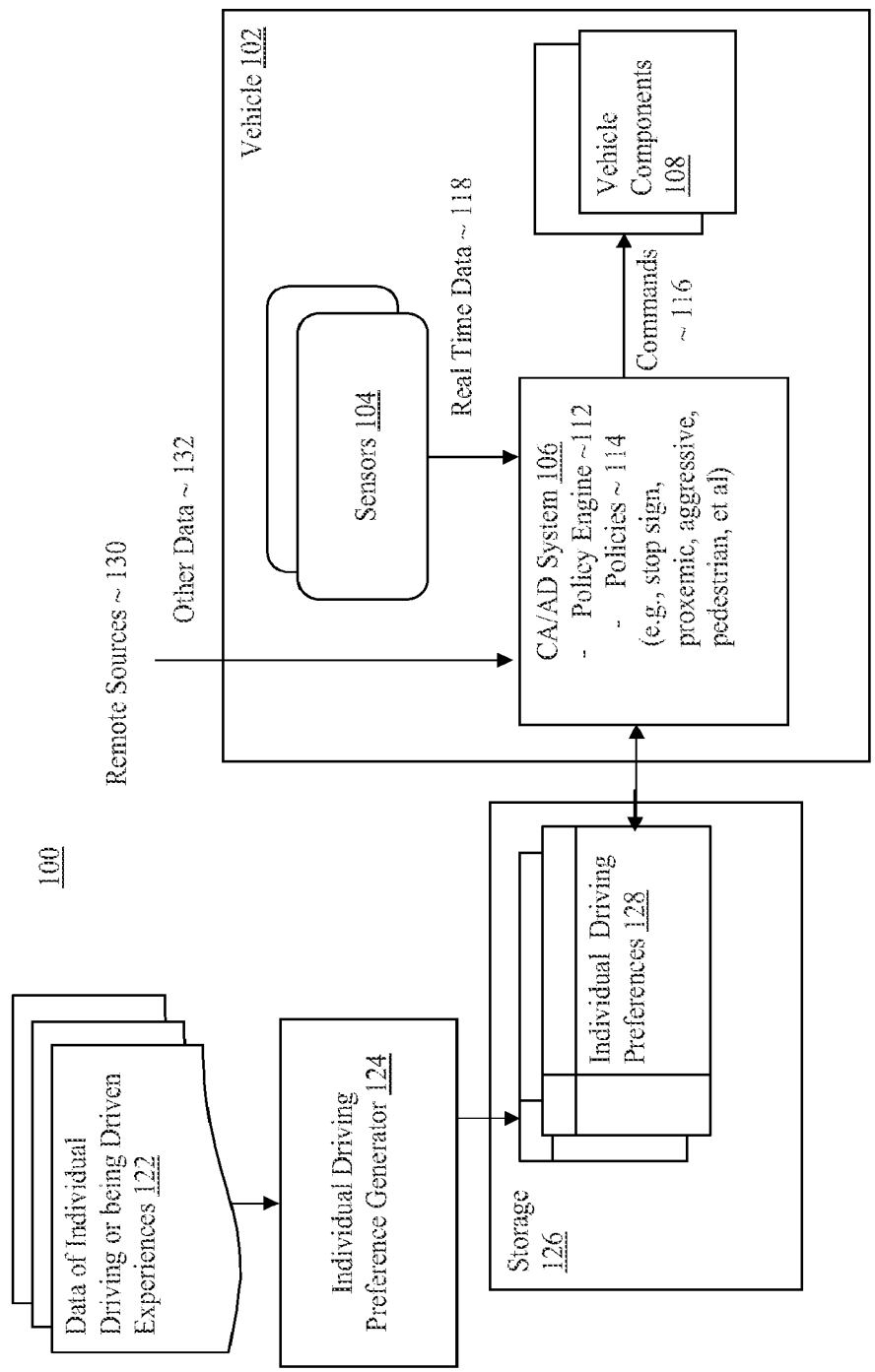
FIG. 1 illustrates a component view of an individual driving preference adaptable computerized assist or autonomous driving arrangement of the present disclosure, in accordance with various embodiments.

Apparatuses, methods and storage medium associated with computerized assist or autonomous driving of vehicles are disclosed herein. In various embodiments, an apparatus for computerized assist or autonomous driving of vehicles may include a computerized assist or autonomous driving system to: first receive an identifier identifying a driver of a vehicle (in the case of computerized assist) or a passenger of a vehicle (in the case of autonomous driving); request or retrieve, using the identifier, one or more individual driving preferences of the driver or passenger; and apply at least one of the one or more individual driving preferences of the driver or passenger to one or more policies for computerized assist or autonomous driving of the vehicle, to customize the one or more policies for computerized assist or autonomous driving of the vehicle for the driver or passenger. The computerized assist or autonomous driving system may further second receive a plurality of data for policy parameters of the one or more customized policies; and assist or autonomously drive the vehicle, in a manner that is adapted for the driver or passenger, in accordance with the one or more customized policies, based at least in part on the plurality of data for the policy parameters of the one or more customized policies.

For example, some drivers or passengers may prefer to drive or be driven in a "cautious" style, whereas other drivers or passengers may prefer to drive or be driven in a more "sport" like style. Still other drivers or passengers may prefer to drive or be driven in a "chauffeured" like style. Accordingly, learning and applying individual driver or passenger driving preferences to policies governing computerized assist or autonomous driving of vehicles may enable better driving or passenger experience by provided by the computerized assist or autonomous driving systems. Further, introducing individual driving references may reduce the likelihood of multiple computerized assist or autonomous driving system operated vehicles to behave in the same manner, e.g., in an emergent situation.

In various embodiments, an apparatus for computerized assist or autonomous driving of vehicles may include an individual driving preference generator to: receive a plurality of data associated with an individual driving a vehicle, or the individual being driven in a vehicle; and generate or update one or more individual driving preferences for customization of one or more policies governing computerized assist or autonomous driving of a vehicle, for the individual as a driver or passenger of the vehicle, wherein generate or update may be based at least in part on the data associated with the individual driving a vehicle, or the individual being driven in a vehicle.

Other embodiments may include methods practiced by these apparatuses to provide individual driving preference adapted computerized assist or autonomous driving of vehicles. Still other embodiments may include storage medium/media having instructions that enable apparatuses, in response to execution of the instructions, to provide individual driving preference adapted computerized assist or autonomous driving of vehicles.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "In various embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1 wherein a component view of a computerized assist or autonomous driving (CA/AD) arrangement of the present disclosure is illustrated, in accordance with various embodiments. As illustrated, CA/AD arrangement 100 may include individual driving preference generator 124, storage 126, and CA/AD system 106, operatively coupled with each other as shown. Individual driving preference generator 124 may be configured to generate individual driving preferences 128 for individuals as drivers or passengers, based on data 122 collected from various individual driving or being driven experiences. Examples of individual driving preferences may include, but are not limited to, a "cautious" style, a "sport" style, or a "chauffeured" style. Individual driving preferences may also vary depending on whether the driver or passenger is commuting or pleasure driving. Storage 126 may be configured to store individual driving preferences 128, and to selectively provide individual driving preferences 128 to CA/AD system 106, in response to a request from CA/AD system 106. CA/AD system 106 may be configured to in turn apply the individual driving preferences 128 to customize policies 114 employed to govern CA/AD of vehicles, and adapt commands 116 provided to various vehicle components 108, while providing CA/AD to a vehicle. Resultantly, better driving experience, closer to an individual's driving preference, may be potentially provided to its users by CA/AD system 106. Automakers, once again may once again create market differentiation based on the "feel" of the drive, and the amount of "control" or "responsiveness" that the car provides for the driver or passenger. Moreover, the likelihood of multiple vehicles operated by difference instances of CA/AD system 106 behaving in the same manner, e.g., in an emergent situation, may be reduced. Further, CA/AD system 106 may be less vulnerable to malicious attacks. These and other aspects of CA/AD arrangement 100 will be described in turn in more detail below.

In various embodiments, individual driving preference generator 124 may be configured to receive a variety of data 122 of individual driving or being driver experiences from a variety of sources. For examples, data 122 may include an individual's preferences in making stops at stop signs, such as, but not limited to, the individual's typical deceleration pattern, stopping distance pattern, or acceleration pattern after stops. As further examples, data 122 may also include, but are not limited to, an individual's preferences in term of the typical distance the individual kept from a vehicle in front, or a level of aggressiveness in lane changing, going through intersections, merging and so forth. Individual driving preferences 128, and their usage will be further described below, including references to FIGS. 4-6.

In various embodiments, data 122 may be collected via sensors embedded in vehicles driven by the individuals or the individuals being driven in, or in infrastructures, such as traffic lights, utility poles/towers, road signs and so forth, along the routes driven by the individuals or his/her drivers. In still other embodiments, data 122 may be collected via sensors embedded in vehicle simulators operated by the individuals or the individuals' drivers/chauffeurs. The sensors may include a wide range of acoustic, optical, electro-magnetic sensors, such as, but not limited to, microphones, cameras, accelerometers, gyroscopes, and so forth.

In various embodiments, individual driving preference generator 124 may be implemented in hardware and/or software. Examples of a hardware implementation may include, but are not limited to application specific integrated circuit (ASIC) or programmable integrated circuit, such as, field programmable gate arrays (FPGA), programmed with the operatic logic. An example of a software implementation may include programming instructions configured with the operatic logic, to be executed on a computing device.

Storage 126 may be any one of a number of persistent storage devices known in the art, including, but are not limited to, magnetic, optical, and/or solid state storage devices. In various embodiments, storage 126 may be networked storage. In various embodiments, storage 126 may be hosted by a networked server. In either case, the networked storage or the networked server may be accessible via one or more wired and/or wireless, local and/or wide-area, private and/or public networks (e.g., the Internet). An example of wired network may include, but is not limited to, Ethernet. Wireless networks may include, but are not limited to, WiFi, and/or 3G/4G/5G wireless networks.

In various embodiments, storage 126 may be co-located or co-hosted by the same computer system hosting individual driving preference generator 124. In alternate embodiments (not shown), storage 126 may be locally disposed in vehicle 102. In other embodiments (not shown), a smaller version of storage 126 may be locally disposed in vehicle 102 to cache selected ones of the individual driving preferences 128 for one or more individual drivers or passengers.

Continue to refer to FIG. 1, CA/AD system 106 may be disposed in vehicle 102, and configured to provide CA/AD of vehicle 102, issuing commands 116 to various components 108 of vehicle 102, based at least in part on real time data 118 from local sensors 104, and/or other (real time or historic) data 132 from various remote sources 130. In various embodiments, CA/AD system 106 may include policy engine 112 configured to apply various policies 114 to govern provision of CA/AD of vehicle 102, i.e., the issuance of commands 116 to various components 108 of vehicle 102, in view of data 118 and 132 received. In particular, CA/AD system 106 may be further configured to apply a set of individual driving preferences 128 of the current driving individual (in the case of computerized assist) or passenger being driven (in the case of autonomous driving), to policies 114 to customize policies 114, and govern CA/AD of vehicle 102 in accordance with the customized versions of policies 114.

In various embodiments, policies 114 may include, but are not limited to, stop sign policies, pedestrian policies, proxemic policies and/or aggression policies. As earlier described, a stop sign policy may provide, e.g., but are not limited to, the deceleration pattern, stopping distance, and acceleration pattern, when approaching a stop sign. Pedestrian policies may specify, e.g., whether pedestrians are to be given absolutely, partial or no right-of-way for various localities. Proxemic policies may specify, e.g., a typical amount of distance to keep from a vehicle in front. Aggression policies may specify various aggressive levels for various traffic situations for various localities, e.g., from defensive, to mildly aggressive, or very aggressive. The term "aggression" and its various forms, as used herein, in general, refer, but not necessarily limited to, assertiveness or boldness in driving the vehicle. In other embodiments, other policies may also be employed, the stop sign, pedestrian, proxemic and aggression policies described are merely illustrative and not limiting.

In various embodiments, policies 114 may be location or locality specific. That is, the policies to be nominally employed (prior to individual driving preference adaptation) may vary, and take into consideration location or locality customs, depending on the operating area of vehicle 102. Examples of locality may include, but are not limited to, a continent, a country, a state or province, a county, a city, a township, or a village. Example of a location may include, but are not limited to, an intersection, a stop sign, a mile post, an on ramp or a specific global positioning system (GPS) position. For further description of locality adapted CA/AD of vehicle 102, refer to technically related PCT application no. PCT/US2013/056207, filed Aug. 22, 2013, entitled "Locality Adapted Computerized Assisted or Autonomous Driving of Vehicles."

Data 118 may include various operational data of vehicle 102 including, but are not limited to, speed, acceleration, deceleration, distance to the vehicle in front, date, time of day, current volume of traffic, presence or absence of pedestrian or bicycles, and so forth. In various embodiments, data 118 may be nominal data, and CA/AD system 106 may be configured to process the nominal data to derive the substantive data. For example, data 118 may include nominal data, such as images captured by an image capturing sensor 104 (camera), and CA/AD system 106 may be configured to process the images (nominal data) to determine the presence or absence of pedestrian or bicycles at an interaction (the substantive data).

Data 118 may include in particular, identity of the driving individual or passenger, whose driving preferences are to be applied. In various embodiments, sensors 104 may include in particular an electro-magnetic reader in reading the identity of the driving individual or passenger, whose driving preferences are to be applied, from an "ignition" key, a radio frequency identification (RFID) module, and so forth. Data 118 may also include a current location of vehicle 102. In various embodiments, sensors 104 may include in particular, a GPS receiver configured to receive GPS signal and provide current GPS position of vehicle 102 to CA/AD system 106.

Thus, similar to the earlier described sensors employed to collect data 122 associated with individual driving or being driven experience, sensors 104 may include a wide range of acoustic, optical, electro-magnetic sensors known in the art, including, but are not limited to, microphones, cameras, accelerometers, gyroscopes, and so forth.

Data 132 may include, but are not limited, traffic volume data, weather data, crime data, law enforcement data, and so forth. Thus, remote sources 130 may include, but are not limited to, traffic web sites, weather web sites, law enforcement web sites, and so forth. Vehicle 102 may further include networking interface (not shown) for accessing remote sources 130 via one or more wireless and/or wired, local and/or wide area, and private and/or public networks, e.g., networks of wireless cellular carrier service, Internet, and so forth.

Vehicle components 108 may include, but are not limited to, fuel injectors, steering, transmission gears, and brakes, whereas examples of commands 106 may include, but are not limited to, increase/decrease amount of fuel to be injected into the engine of vehicle 102, steer right or left, up shift or down shift gears, apply or cease to apply brake, and so forth.

Still referring to FIG. 1, during operation, CA/AD system 106 may first receive an identity of the driving individual or passenger being driven, and/or receive/derive a current location/locality of vehicle 102. In response, CA/AD system 106 may request individual driving preferences of the driving individual or passenger being driven, from storage 126 (or retrieve the individual driving preferences from a local cache (not shown)), based on the identity of the driving individual or passenger being driven. Optionally, CA/AD 106 may likewise request locality specific policies 114 for locality specific CA/AD of vehicle 102 for the current locality, from a remote source (not shown) (or retrieve from a local cache (not shown)), based on the current location received. On receipt of the individual driving preferences (and optionally, locality specific policies), CA/AD system 106 may customize policies 114, based at least in part on the individual driving preferences. Thereafter, CA/AD system 106 may assist or autonomously drive vehicle 102, based at least in part on the customized versions of policies 114, and data 118 and/or 132 associated with policy parameters of the customized versions of policies 114.

In various embodiments, during operation, CA/AD system 106 may first receive identities of multiple passengers being driven instead. In response, CA/AD system 106 may request individual driving preferences of the passengers being driven, from storage 126 (or retrieve the individual driving preferences from a local cache (not shown)), based on the identities of the passengers being driven. For these embodiments, CA/AD system 106 may further combine the corresponding individual driving preferences of the passengers being driven on a weighted basis or according to one or more machine learning algorithms, before applying the individual driving preferences to customize policies 114, and assist or drive vehicle 102 as earlier described. For examples, the individual driving preferences of the passengers for stop signs, pedestrians, and so forth, may be respectively combined. The weights given to the individual driving preferences may be user specified or vary depending on implementations, e.g., based on where the passengers are seated. Examples of machine learning algorithms may include any one of a number of supervised, unsupervised or reinforcement learning algorithms.

In various embodiments, CA/AD system 106 may be implemented in hardware and/or software. Examples of a hardware implementation may include, but are not limited to application specific integrated circuit (ASIC) or programmable integrated circuit, such as, field programmable gate arrays (FPGA), programmed with the operatic logic. An example of a software implementation may include programming instructions configured with the operatic logic, to be executed on a computing device.

Before further describing the individual driving preference adapted CA/AD of vehicles of the present disclosure, it should be noted while for ease of understanding and completeness, CA/AD arrangement 100 has been described including individual driving preference generator 124 and storage 126 being disposed outside vehicle 102, while sensors 104 and CA/AD System 106 being disposed inside vehicle 102, the description is not meant to suggest that the various elements 124, 126, 104 and 106 have to be provided by the same entity. It is anticipated that, In various embodiments, the various elements may be developed and provided by different entities. For example, CA/AD system 106 may be developed by one entity, while the individual driving preference generator 124 and/or policies 114 may be developed by one or more other entities. CA/AD system 106 developed by one entity may be selectively preload, or download, on an as needed basis, the individual driving preferences and/or policies generated by the one or more other entities.

Figure 2:
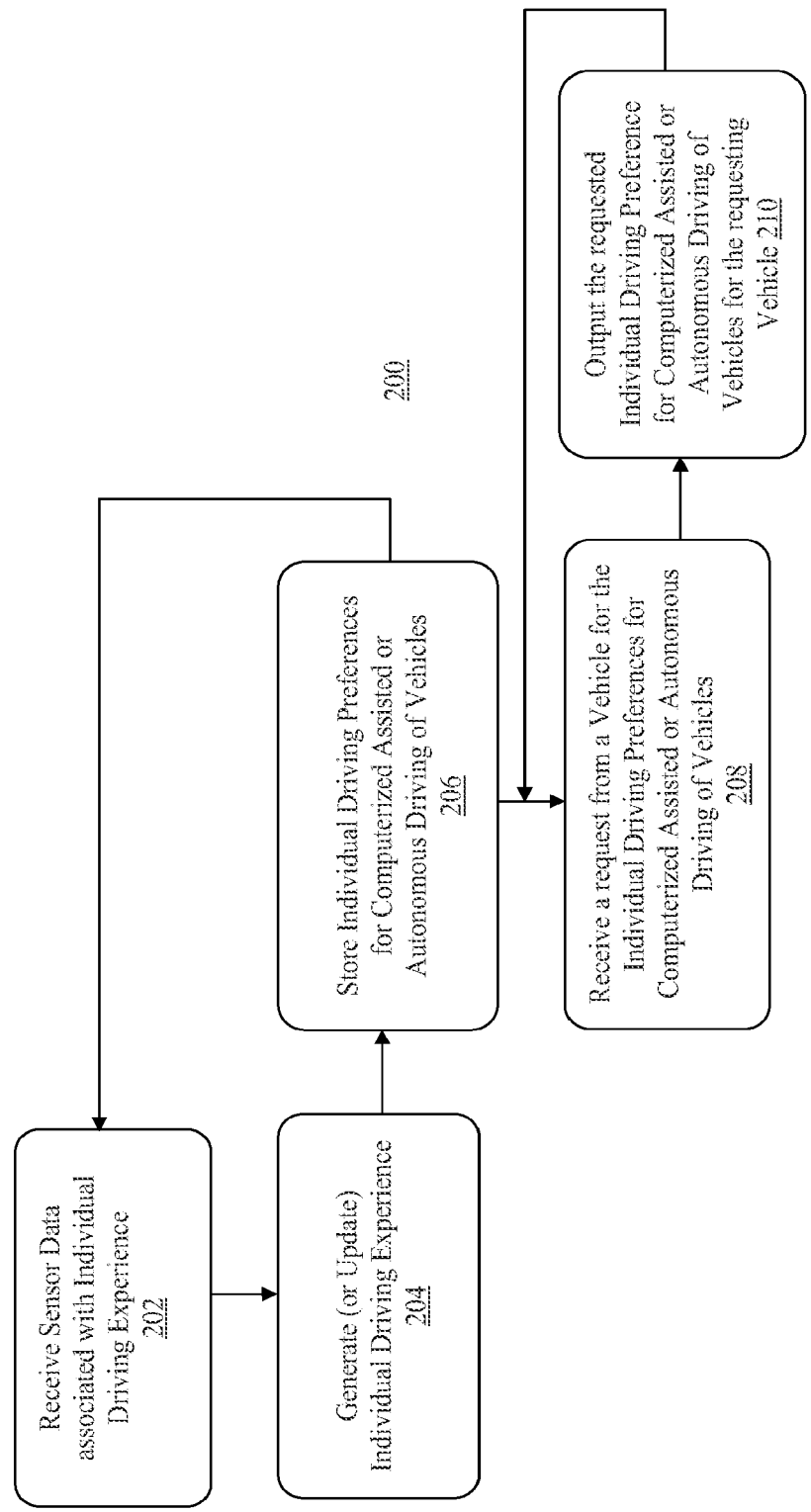
FIG. 2 illustrates a method for generating individual driving preferences for application to specific computerized assist or autonomous driving policies, in accordance with various embodiments.

Referring now FIG. 2, wherein a method for generating and providing individual driving preferences is illustrated, in accordance with various embodiments. As shown, method 200 may include operations in blocks 202-210, to be described more fully below. In various embodiments, operations of blocks 202-206 may be performed, e.g., by the earlier described individual driving preference generator 124; whereas operations of blocks 208-210 may be performed, e.g., by a networked storage or a networked server having the earlier described storage 126.

As illustrated, method 200 may start at block 202. At block 202, data associated with individual driving or being driven experience may be received. As described earlier, the data may include a wide range of data, in various forms, collected by various sensors and/or data collection devices.

From block 202, method 200 may proceed to block 204, and then block 206. At block 204, individual driving preferences, such as stopping at a stop sign, yielding to pedestrian/bikes, keep distance from the vehicle in front, general aggression level, and so forth, may be generated for the individual drivers or passengers, based at least in part on the wide range of data associated with the driving or being driven experience. At block 206, the generated individual driving preferences may be stored, e.g., in a networked storage or a networked server, for subsequent provision to a CA/AD system on a vehicle.

From block 206, method 200 may proceed to block 208, and then block 210. At block 208, a request for individual driving preferences for a driver or passenger for customizing CA/AD of a vehicle may be received, e.g., from a vehicle. The request may include e.g., an identity of the driver or passenger. In response, at block 210, the requested individual driving preferences for the driver or passenger may be retrieved and returned to the requesting vehicle. The request may be received to preload a CA/AD system of a vehicle, e.g., at manufacturing or delivery time, or on demand, e.g., when a vehicle starts up.

Additionally, from block 206, method 200 may proceed back to block 202 to have operations of blocks 202-206 to be performed for another driver or passenger. The operations of blocks 202-206 may be repeated as many times as necessary depending on the number of drivers or passengers, needed to have individual driving preferences generated. Likewise, operations of blocks 208-210 may be repeated as many times as necessary to respond to requests for individual driving preferences to adapt CA/AD of vehicles.

Figure 3:
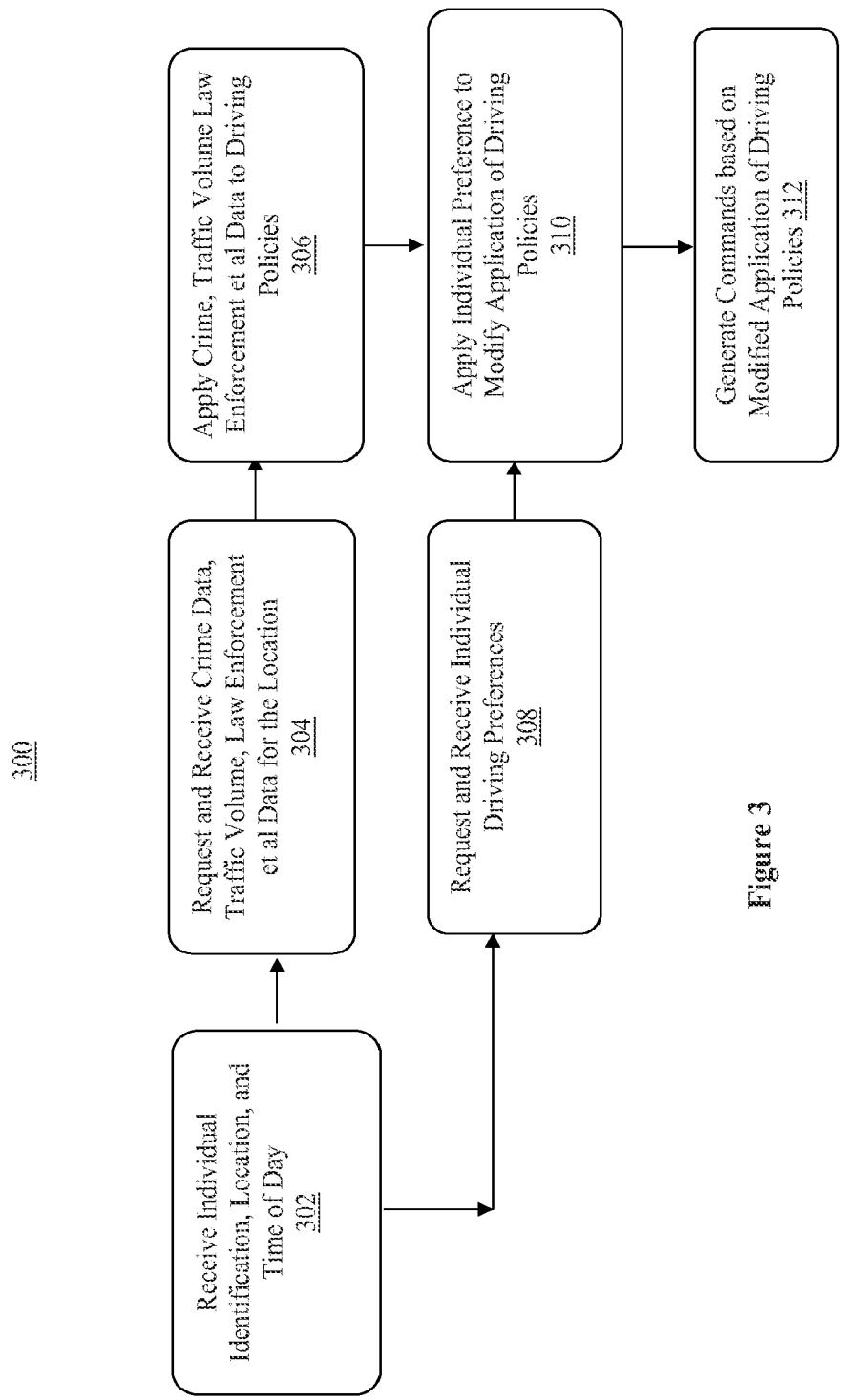
FIG. 3 illustrates an example method for applying individual driving preferences to computerized assist or autonomous driving policies to driving vehicles, in accordance with various embodiments.

Referring now to FIG. 3, wherein an example method for applying individual driving preferences to customize CA/AD policies is illustrated, in accordance with various embodiments. As shown, example method 300 may include operations in blocks 302-312, to be described more fully below. In various embodiments, operations of blocks 302-312 may be performed, e.g., by the earlier described CA/AD system 106.

As illustrated, example method may start at block 302. At block 302, an identification of a driver of a vehicle (in the case of computerized assist) or one or more passengers of a vehicle (in the case of autonomous driving), a current location of the vehicle, and/or time of day may be received. As earlier described, the identification(s) of the driver or passenger(s) may, e.g., be electro-magnetically read from a wireless ignition key or a RFID module, and the current location may, e.g., be received from a GPS receiver. The time of day may be maintained by CA/AD system 106. From block 302, example method 300 may proceed to blocks 304 and 308.

At block 304, various data, such as traffic volume, crime level, law enforcement likelihood of a locality/location, and so forth, may be requested and received, or retrieved. The traffic volume data for the location may be contemporaneous with the vehicle driving through the location, while the crime and law enforcement likelihood of the locality/location may be historic. At block 308, individual driving preferences for the driver or passenger(s) may similarly be requested and received, or retrieved. In the case of multiple passengers, their corresponding individual driving preferences may be combined as earlier described.

From block 304, method 300 may proceed to block 306. At block 306, policies, such as stop sign, proxemics, aggression, and so forth (cross localities or locality specific) may be applied to generate policy outputs, using the traffic volume, crime level, law enforcement et al data of the location. From blocks 306 and 308, method may proceed to block 310.

Figure 5:
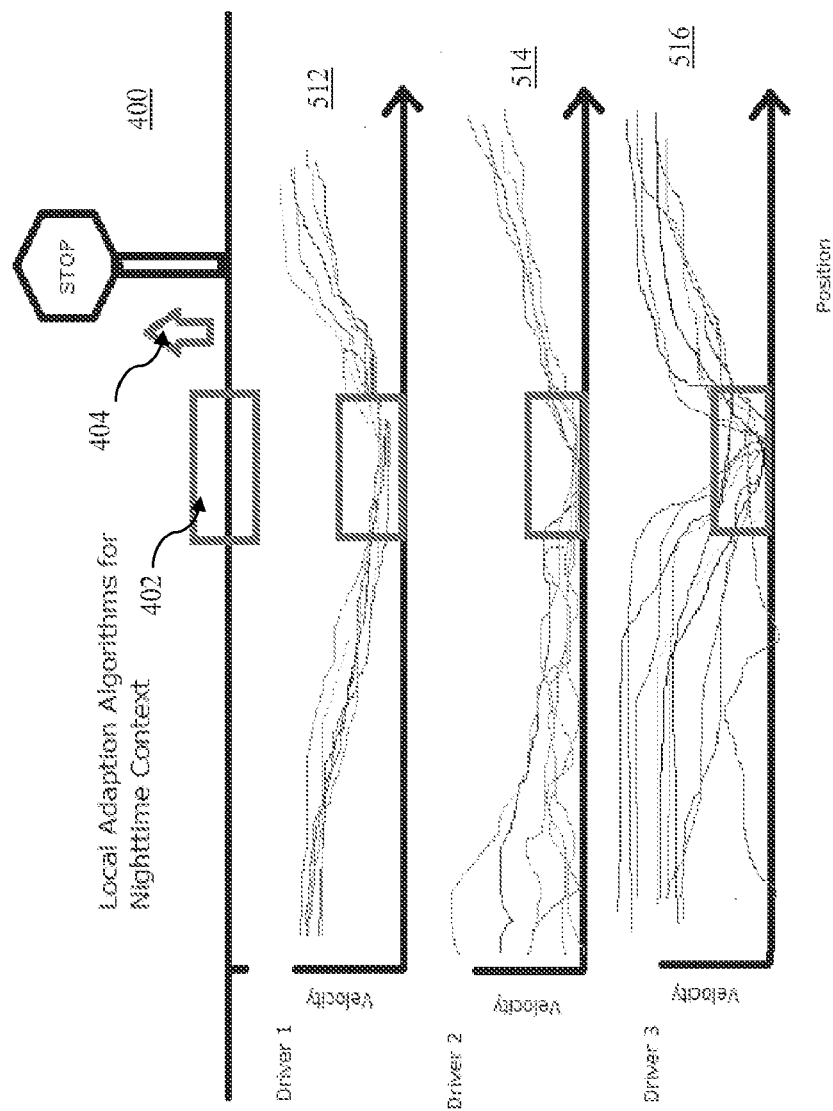
FIG. 5 illustrates the example result of applying the example individual driving preferences to the example stop sign policy of FIG. 4, in accordance with various embodiments.
Figure 6:
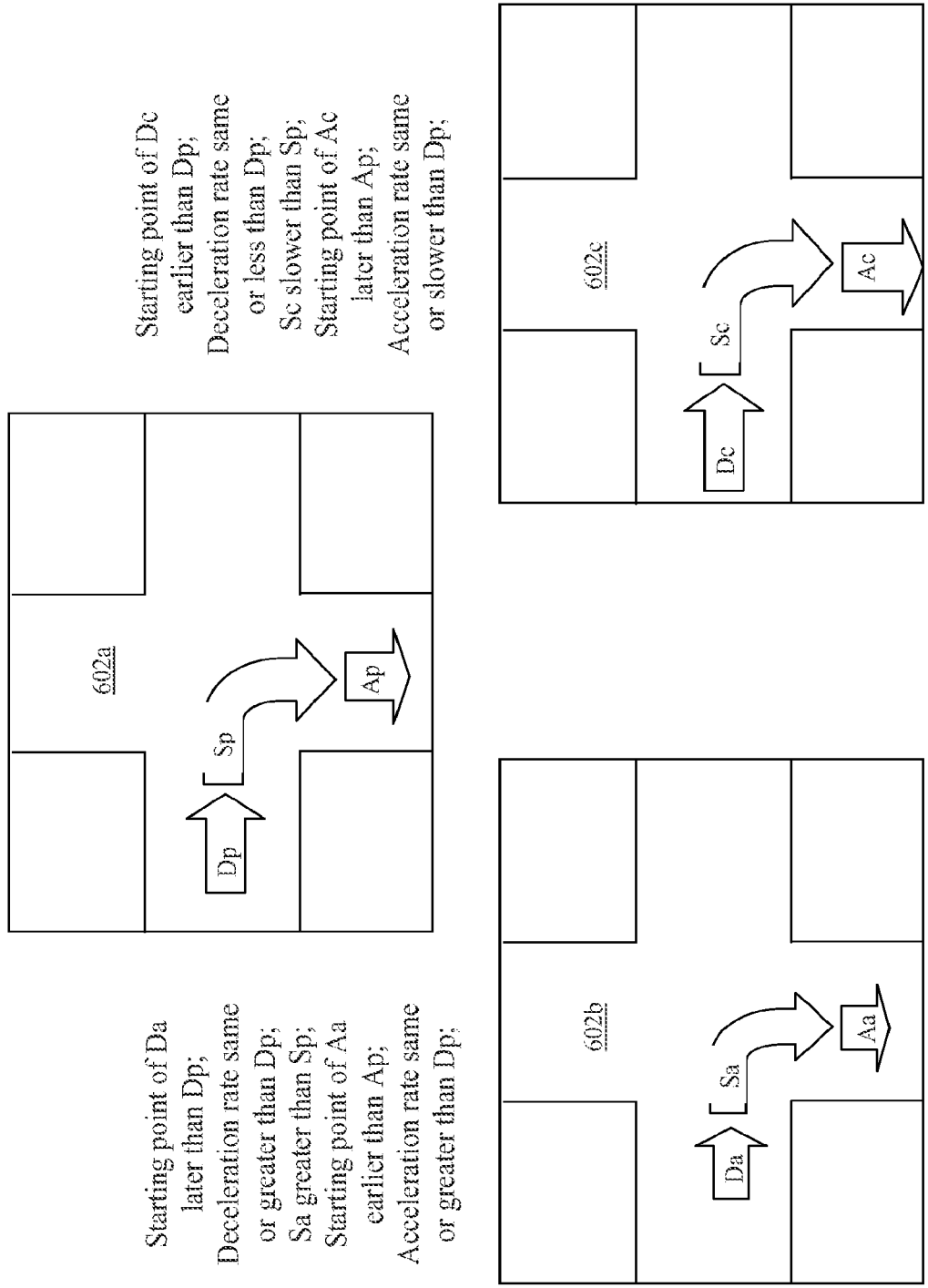
FIG. 6 illustrates an example right turn policy, and an example result of applying example individual driving aggressiveness preferences to the example right turn policy, in accordance with various embodiments.

At block 310, the individual driving preferences of the driver or passenger(s) may be applied to modify the application of the various policies. The application of individual driving preferences of the driver or passenger(s) to modify the application of the various policies may be implementation, policy and/or policy parameters dependent. For example, in some implementations, for some policies or policy parameters, the individual driving preferences may override the policy outputs, while in other implementations, for some policies or policy parameters, the individual driving preferences may be combined with the policy outputs, e.g., on a weighted basis or according to one or more machine learning algorithms. Likewise, the weights given to the policy outputs and the individual driving preferences may vary depending on implementations. Examples of machine learning algorithms may include any one of a number of supervised, unsupervised or reinforcement learning algorithms. In still other embodiments, some policies or policy parameters, such as those related to safety, in particular, those related to pedestrian and/or bike safety, may not be overridden by the individual driving preferences. In other words, in special circumstance, the individual driving preferences may be ignored. Application of individual driving preferences to modify initial policy outputs will be further described with references to FIGS. 4-6, illustrating example applications of individual driving preferences to an example stop sign policy for making stops at stop signs, and an example right turn policy for making a right turn at an intersection.

From block 310, example method may proceed to block 312. At block 312, various commands may be issued to various components of the vehicle, based on the modified policy outputs, to CA/AD of the vehicle. As described earlier, the various components may include fuel injector, steering, transmission gears, brakes, and so forth, whereas examples of commands 106 may include, but are not limited to, increase/decrease amount of fuel to be injected into the engine of vehicle 102, steer right or left, up shift or down shift gears, apply or cease to apply brake, and so forth.

Figure 4:
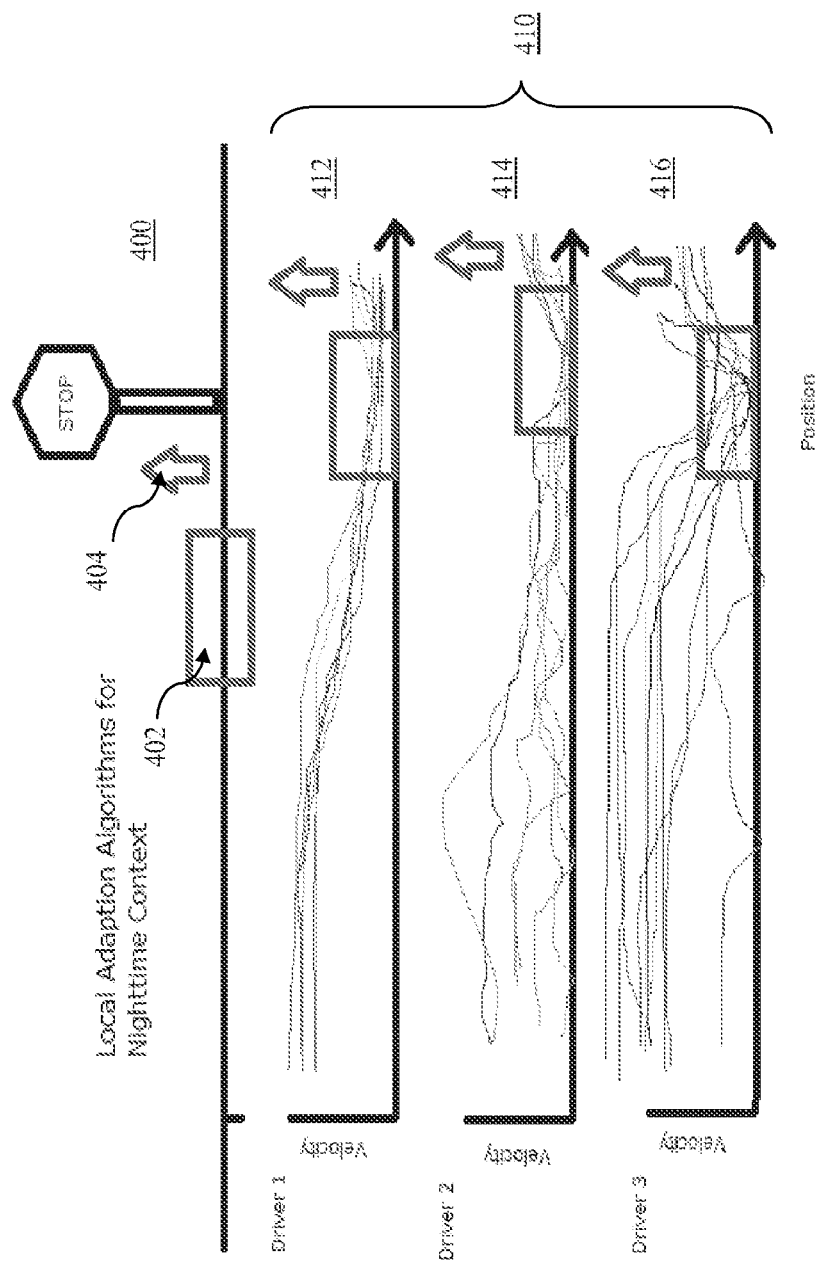
FIG. 4 illustrates an example stop sign policy, and an example collection of individual driving preferences for making stops at stop signs, in accordance with various embodiments.

Referring now to FIG. 4, wherein an example stop sign policy and example individual driving preferences for making stops at stop signs are illustrated, in accordance with various embodiments. More specifically, FIG. 4 illustrates the application of a stop sign policy 400 for a location with certain crime and/or law enforcement level at night time. Stop sign policy 400, on determining the matching crime and/or law enforcement level at night time for a location will nominally CA/AD the vehicle, causing the vehicle to stop 402 short of the stop sign for an amount of distance, and accelerate 404 through the stop sign.

FIG. 4 also illustrates an example collection 410 of individual driving preferences 412-416 for making a stop at a stop sign for three example drivers or passengers. In the case of example 412, the driver or passenger tends to prefer a consistent gradual deceleration, stop at the stop sign, and gradually accelerate after making the stop. Whereas, for example 414, the driver or passenger tends to have a more erratic or variable deceleration, stop pass the stop sign, and accelerate at a faster rate than example 412, after making the stop. For example 416, the driver or passenger tends to have a relatively steep deceleration, stop at the stop sign, and accelerate aggressively, after making the stop.

FIG. 5 illustrates example respective applications of individual driving preferences 412-416 to example stop sign policy 400. As shown, for these examples, the stopping location 400, with an amount of distance before the stop sign, was not modified. However, in each case, 512-516, the deceleration and acceleration patterns of the respective individual driving preferences 412-416 are respectively adopted.

Referring now to FIG. 6, wherein an example right turn policy, and results for application of example individual driving preferences for aggressiveness to the example right turn policy are illustrated, in accordance with various embodiments. More specifically, illustration 602a depicts the application of a right turn policy 400 for an interaction at locality where pedestrians are accorded no rights. In other words, at this locality (e.g., in an emerging country), vehicles generally do not stop for pedestrians, when making a right turn at an intersection. Accordingly, right turn policy 400 specifies certain deceleration pattern Dp (including the starting point of deceleration and the deceleration rate), the turn speed Sp, and the acceleration pattern Ap (including the starting point of acceleration and the acceleration rate).

Illustration 602b depicts the result of application of an aggressive individual driving preference to the right turn policy. As shown, deceleration pattern Da has a deceleration starting point later than deceleration pattern Dp. The deceleration rate may be the same or less than the deceleration rate of deceleration pattern Dp, resulting in a turn speed Sa that is higher than the turning speed Sp. Further, the acceleration pattern Aa has an acceleration starting point, after the turn, earlier than acceleration pattern Ap. The acceleration rate may be the same or higher than the acceleration rate of acceleration pattern Ap. Further, CA/AD system 106 may additional honk at any pedestrian and/or bicycles present at the intersection.

Illustration 602c, on the other hand, depicts the result of application of a conservative individual driving preference to the right turn policy. As shown, deceleration pattern Dc has a deceleration starting point earlier than deceleration pattern Dp. The deceleration rate may be the same or faster than the deceleration rate of deceleration pattern Dp, resulting in a turn speed Sc that is slower than the turning speed Sp. Further, the acceleration pattern Ac has an acceleration starting point, after the turn, later than acceleration pattern Ap. The acceleration rate may be the same or less than the acceleration rate of acceleration pattern Ap.

These are just a few non-limiting illustration of applying individual driving preferences to CA/AD of a vehicle.

Figure 7:
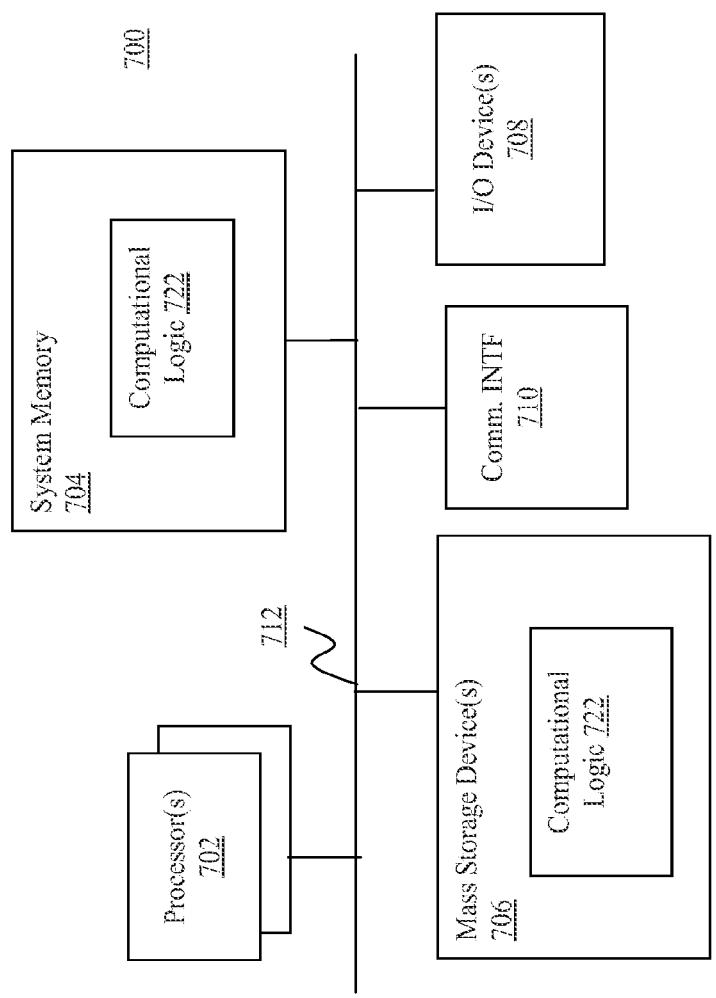
FIG. 7 illustrates an example computing environment suitable for practicing the disclosure, in accordance with various embodiments.

Referring now to FIG. 7, wherein an example computer suitable for use for the arrangement of FIG. 1, in accordance with various embodiments, is illustrated. As shown, computer 700 may include one or more processors or processor cores 702, and system memory 704. In various embodiments, multiples processor cores 702 may be disposed on one die. For the purpose of this application, including the claims, the terms "processor" and "processor cores" may be considered synonymous, unless the context clearly requires otherwise. Additionally, computer 700 may include mass storage device(s) 706 (such as diskette, hard drive, compact disc read only memory (CD-ROM) and so forth), input/output device(s) 708 (such as display, keyboard, cursor control and so forth) and communication interfaces 710 (such as network interface cards, modems and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage device(s) 706 may be employed to store a working copy and a permanent copy of the programming instructions implementing the operations associated with individual driving preference generator 124 and/or CA/AD system 106, earlier described, collectively referred to as computational logic 722. The various elements may be implemented by assembler instructions supported by processor(s) 702 or high-level languages, such as, for example, C, that can be compiled into such instructions.

The permanent copy of the programming instructions may be placed into permanent mass storage device(s) 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 710-712 may vary, depending on the intended use of example computer 700, e.g., whether example computer 700 is a stationary computing device like a set-top box or a desktop computer, or a mobile computing device, like a smartphone, tablet, ultrabook or laptop. The constitutions of these elements 710-712 are otherwise known, and accordingly will not be further described.

FIG. 8 illustrates an example non-transitory computer-readable storage medium having instructions configured to practice all or selected ones of the operations associated individual driving preference generator 124 and/or CA/AD system 106, earlier described, in accordance with various embodiments. As illustrated, non-transitory computer-readable storage medium 802 may include a number of programming instructions 804. Programming instructions 804 may be configured to enable a device, e.g., computer 700, in response to execution of the programming instructions, to perform, e.g., various operations of methods 200 and/or 300 of FIGS. 2-3 respectively. In alternate embodiments, programming instructions 804 may be disposed on multiple non-transitory computer-readable storage media 802 instead.

Referring back to FIG. 7, for one embodiment, at least one of processors 702 may be packaged together with a memory having computational logic 722 (in lieu of storing in memory 704 and/or mass storage device 706) configured to practice aspects of the process of FIG. 2 or 3. For one embodiment, at least one of processors 702 may be packaged together with computational logic 722 configured to practice aspects of the process of FIG. 2 or 3 to form a System in Package (SiP). For one embodiment, at least one of processors 702 may be integrated on the same die with computational logic 722 configured to practice aspects of the process of FIG. 2 or 3. For one embodiment, at least one of processors 702 may be packaged together with computational logic 722 configured to practice aspects of the process of FIG. 2 or 3 to form a System on Chip (SoC). For at least one embodiment, the SoC may be utilized in, e.g., but not limited to, a computing tablet.

Thus, example embodiments described include, but are not limited to:

Example 1 may be an apparatus for computerized assist or autonomous driving of vehicles having one or more processors; and a computerized assist or autonomous driving system. The computerized assist or autonomous driving system may be operated by the one or more processors to: first receive an identifier identifying a driver or passenger of a vehicle; request or retrieve, using the identifier, one or more individual driving preferences of the driver or passenger; and apply at least one of the one or more individual driving preferences of the driver or passenger to one or more policies for computerized assist or autonomous driving of the vehicle, to customize the one or more policies for computerized assist or autonomous driving of the vehicle for the driver or passenger. Further, the computerized assist or autonomous driving system may be operated by the one or more processors to: second receive a plurality of data for policy parameters of the one or more customized policies; and assist or autonomously drive the vehicle, in a manner that is adapted for the driver or passenger, in accordance with the one or more customized policies, based at least in part on the plurality of data for the policy parameters of the one or more customized policies.

Example 2 may be example 1, wherein request or retrieve may include request a remote server for the one or more individual driving preferences, and wherein receive may include receive from the remote server the one or more individual driving preferences.

Example 3 may be example 1 or 2, further including local storage coupled with the computerized assist or autonomous driving system, to store the one or more individual driving preferences, and wherein request or retrieve may include retrieve, from the local storage, the one or more individual driving preferences.

Example 4 may be any one or examples 1-3, wherein the one or more policies may include a stop sign policy, a proxemic policy, or an aggression policy; and wherein apply at least one of the one or more individual driving preferences of the driver or passenger to one or more policies may include apply at least one of the one or more individual driving preferences of the driver or passenger to the stop sign policy, the proxemic policy or the aggression policy, to customize the stop sign policy, the proxemic policy or the aggression policy for computerized assist or autonomous driving of the vehicle for the driver or passenger.

Example 5 may be example 4, wherein the stop sign policy specify a deceleration rate, a stopping distance from the stop sign, or an acceleration rate, when making a stop at a stop sign, and wherein apply at least one of the one or more individual driving preferences of the driver or passenger to the stop sign policy may include apply at least one of the one or more individual driving preferences of the driver or passenger to customize the deceleration rate, the stopping distance from the stop sign, or the acceleration rate.

Example 6 may be example 4, wherein the proxemic policy specifies an amount of distance to maintain from a vehicle in front; and wherein apply at least one of the one or more individual driving preferences of the driver or passenger to the proxemic policy may include apply at least one of the one or more individual driving preferences of the driver or passenger to customize the amount of distance to maintain from a vehicle in front.

Example 7 may be example 4, wherein the aggression policy specifies a level of aggression for computerized assist or autonomously driving the vehicle; and wherein apply at least one of the one or more individual driving preferences of the driver or passenger to the aggression policy may include apply at least one of the one or more individual driving preferences of the driver or passenger to customize the level of aggression for computerized assist or autonomously driving the vehicle.

Example 8 may be example 4, wherein the computerized assist or autonomous driving system is to also third receive a current location of the vehicle; wherein second receive may include receive traffic volume, law enforcement, or crime data of the current location; and wherein assist or autonomously drive the vehicle may include assist or autonomously drive the vehicle, based at least in part on the customized stop sign, proxemic or aggression policy, and the traffic volume, law enforcement, or crime data of the current location.

Example 9 may be example 8, wherein the computerized assist or autonomous driving system is to further determine a time of day; wherein the second receive to receive the traffic, law enforcement, or crime data of the current location for the time of day.

Example 10 may be example 4, wherein the one or more policies may further include a pedestrian policy; wherein the computerized assist or autonomous driving system is to also third receive a current location of the vehicle; wherein second receive may include receive real time images of the current location of the vehicle; and wherein the computerized assist or autonomous driving system is to further process the real time images to determine whether one or more pedestrians are present at the current location.

Example 11 may be an apparatus for computerized assist or autonomous driving of vehicles having one or more processors; and a an individual driving preference generator. The individual driving preference generator may be operated by the one or more processors to: receive a plurality of data associated with an individual driving a vehicle, or the individual being driven in a vehicle; and generate or update one or more individual driving preferences for customization of one or more policies governing computerized assist or autonomous driving of a vehicle, for the individual as a driver or passenger of the vehicle, wherein generate or update is based at least in part on the data associated with the individual driving a vehicle, or the individual being driven in a vehicle received.

Example 12 may be example 11, wherein the plurality of data associated with an individual driving a vehicle or being driven in a vehicle, are respectively collected from multiple instances of the individual's operation or the individual's chauffeur's operation of a vehicle simulator.

Example 13 may be example 11 or 12, further including storage coupled with the individual driving preference generator to store the individual driving preferences; wherein the storage is to output an individual driving preference for a vehicle, in response to a request for the individual driving preference by the vehicle; wherein the apparatus, including the individual driving preference generator and the storage, is remotely disposed from the vehicle.

Example 14 may be any one of examples 11-13, wherein the one or more policies may include a stop sign policy, a proxemic policy, or an aggression policy governing computerized assist or autonomous driving of a vehicle; and wherein at least one of the one or more individual driving preferences are employed to customize the stop sign policy, the proxemic policy, or an aggression policy for computerized assist or autonomous driving of a vehicle for the individual as a driver or passenger.

Example 15 may be any one of examples 11-14, wherein the one or more policies may include a stop sign policy that specifies a deceleration rate, a stopping distance from a stop sign, and an acceleration rate for stopping at a stop sign, during provision of computerized assist or autonomous driving of a vehicle; and wherein the one or more individual driving preferences may include one or more preferences for the deceleration rate, the stopping distance from a stop sign, and the acceleration rate for stopping at a stop sign, during provision of computerized assist or autonomous driving of a vehicle for the individual as a driver or passenger.

Example 16 may be a method for computerized assist or autonomous driving of vehicles, including: first receiving, by a computerized assist or autonomous driving system, at least an identifier identifying a driver or passenger of a vehicle; and requesting or retrieving, by the computerized assist or autonomous driving system, using the identifier, one or more individual driving preferences of the driver or passenger; and applying, by the computerized assist or autonomous driving system, at least one of the one or more individual driving preferences of the driver or passenger to one or more policies for computerized assist or autonomous driving of the vehicle, to customize the one or more policies for computerized assist or autonomous driving of the vehicle for the driver or passenger. The method may further include second receiving, by the computerized assist or autonomous driving system, a plurality of data for policy parameters of the one or more customized policies; and assisting or autonomously driving the vehicle, by the computerized assist or autonomous driving system, in a manner that is adapted for the driver or passenger, in accordance with the one or more customized policies, based at least in part on the plurality of data for the policy parameters of the one or more customized policies.

Example 17 may be example 16, wherein the one or more policies may include a stop sign policy, a proxemic policy, or an aggression policy; and wherein applying at least one of the one or more individual driving preferences of the driver or passenger to one or more policies may include apply at least one of the one or more individual driving preferences of the driver or passenger to the stop sign policy, the proxemic policy or the aggression policy, to customize the stop sign policy, the proxemic policy or the aggression policy for computerized assist or autonomous driving of the vehicle for the driver or passenger.

Example 18 may be example 16 or 17, wherein first receiving may include first receiving a plurality of individual driving preferences of a plurality of passengers, and the method may further include combining the corresponding plurality of individual driving preferences of the plurality of passengers; and wherein applying may include applying the at least one of the combined individual driving preferences of the passengers to one or more policies for computerized assist or autonomous driving of the vehicle, to customize the one or more policies for computerized assist or autonomous driving of the vehicle for the passengers.

Example 19 may be a method for computerized assist or autonomous driving of vehicles, including receiving, by an individual driving preference generator, a plurality of data associated with an individual driving a vehicle, or the individual being driven in a vehicle; and generating or updating, by the individual driving preference generator, one or more individual driving preferences for customization of one or more policies governing computerized assist or autonomous driving of a vehicle, for the individual as a driver or passenger of the vehicle, wherein generating or updating is based at least in part on the data associated with the individual driving a vehicle, or the individual being driven in a vehicle received.

Example 20 may be example 19, further including storing, with a storage device, the individual driving preferences; and outputting, by the storage device, an individual driving preference for a vehicle, in response to a request for the individual driving preference by the vehicle; wherein generating, updating, storing and outputting are performed remotely from the vehicle.

Example 21 may be one or more computer readable storage media including a plurality of instructions configured to cause a computerized assist or autonomous driving system, in response to execution of the instructions by the computerized assist or autonomous driving system, to: first receive an identifier identifying a driver or passenger of a vehicle; request or retrieve, using the identifier, one or more individual driving preferences of the driver or passenger; and apply at least one of the one or more individual driving preferences of the driver or passenger to one or more policies for computerized assist or autonomous driving of the vehicle, to customize the one or more policies for computerized assist or autonomous driving of the vehicle for the driver or passenger. The computerized assist or autonomous driving system may be further caused to second receive a plurality of data for policy parameters of the one or more customized policies; and assist or autonomously drive the vehicle, in a manner that is adapted for the driver or passenger, in accordance with the one or more customized policies, based at least in part on the plurality of data for the policy parameters of the one or more customized policies.

Example 22 may be example 21, wherein the one or more policies may include a stop sign policy, a proxemic policy, or an aggression policy; and wherein applying at least one of the one or more individual driving preferences of the driver or passenger to one or more policies may include apply at least one of the one or more individual driving preferences of the driver or passenger to the stop sign policy, the proxemic policy or the aggression policy, to customize the stop sign policy, the proxemic policy or the aggression policy for computerized assist or autonomous driving of the vehicle for the driver or passenger.

Example 23 may be example 21 or 22, wherein first receive may include first receive a plurality of individual driving preferences of a plurality of passengers, and the computerized assist or autonomous driving system is further caused to combine the corresponding plurality of individual driving preferences of the plurality of passengers; and wherein apply may include apply the at least one of the combined individual driving preferences of the passengers to one or more policies for computerized assist or autonomous driving of the vehicle, to customize the one or more policies for computerized assist or autonomous driving of the vehicle for the passengers.

Example 24 may be one or more computer readable storage media including a plurality of instructions configured to cause an individual driving preference generator, in response to execution of the instructions by the individual driving preference generator, to: receive a plurality of data associated with an individual driving a vehicle, or the individual being driven in a vehicle; and generate or update one or more individual driving preferences for customization of one or more policies governing computerized assist or autonomous driving of a vehicle, for the individual as a driver or passenger of the vehicle, wherein generate or update is based at least in part on the data associated with the individual driving a vehicle, or the individual being driven in a vehicle received.

Example 25 may be example 24, wherein the instructions, in response to execution, are to further cause: storage of the individual driving preferences in a storage device; and output, from the storage device an individual driving preference for a vehicle, in response to a request for the individual driving preference by the vehicle; wherein generate, update, store and output are performed remotely from the vehicle.

Example 26 may be an apparatus for computerized assist or autonomous driving of vehicles, including means for receiving an identifier identifying a driver or passenger of a vehicle; means for requesting or retrieving, using the identifier, one or more individual driving preferences of the driver or passenger; means for applying at least one of the one or more individual driving preferences of the driver or passenger to one or more policies for CA/AD of the vehicle, to customize the one or more policies for CA/AD of the vehicle for the driver or passenger; means for receiving a plurality of data for policy parameters of the one or more customized policies; and means for assisting or autonomously driving the vehicle, in a manner that is adapted for the driver or passenger, in accordance with the one or more customized policies, based at least in part on the plurality of data for the policy parameters of the one or more customized policies.

Example 27 may be example 26, wherein the one or more policies may include a stop sign policy, a proxemic policy, or an aggression policy; and wherein means for applying at least one of the one or more individual driving preferences of the driver or passenger to one or more policies may include means for applying at least one of the one or more individual driving preferences of the driver or passenger to the stop sign policy, the proxemic policy or the aggression policy, to customize the stop sign policy, the proxemic policy or the aggression policy for computerized assist or autonomous driving of the vehicle for the driver or passenger.

Example 28 may be example 26 or 27, wherein means for receiving may include means for receiving a plurality of individual driving preferences of a plurality of passengers, and the apparatus may further include means for combining the corresponding plurality of individual driving preferences of the plurality of passengers; and wherein means for applying may include means for applying the at least one of the combined individual driving preferences of the passengers to one or more policies for computerized assist or autonomous driving of the vehicle, to customize the one or more policies for computerized assist or autonomous driving of the vehicle for the passengers.

Example 29 may be an apparatus for computerized assist or autonomous driving of vehicles, including means for receiving a plurality of data associated with an individual driving a vehicle, or the individual being driven in a vehicle; and means for generating or updating one or more individual driving preferences for customization of one or more policies governing computerized assist or autonomous driving of a vehicle, for the individual as a driver or passenger of the vehicle, wherein generating or updating is based at least in part on the data associated with the individual driving a vehicle, or the individual being driven in a vehicle received.

Example 30 may be example 29, further including means for storing the individual driving preferences; and means for outputting an individual driving preference for a vehicle, in response to a request for the individual driving preference by the vehicle; wherein the means for generating and means for storing, are remotely disposed from the vehicle.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for computerized assist or autonomous driving of vehicles, comprising:
   one or more processors; and
   a computerized assist or autonomous driving system to be operated by the one or more processors to:
   first receive an identifier identifying a driver or passenger of a vehicle;
   request or retrieve, using the identifier, one or more individual driving preferences of the driver or passenger;
   apply at least one of the one or more individual driving preferences of the driver or passenger to one or more policies for computerized assist or autonomous driving of the vehicle, to customize the one or more policies for computerized assist or autonomous driving of the vehicle for the driver or passenger;
   second receive a plurality of data for policy parameters of the one or more customized policies; and
   assist or autonomously drive the vehicle, in a manner that is adapted for the driver or passenger, in accordance with the one or more customized policies, based at least in part on the plurality of data for the policy parameters of the one or more customized policies;
   wherein the one or more policies comprise a stop sign policy that specifies a deceleration rate or a stopping location, when making a stop at a stop sign, and wherein apply at least one of the one or more individual driving preferences of the driver or passenger to one or more policies comprises apply at least one of the one or more individual driving preferences of the driver or passenger to the stop sign policy to customize the deceleration rate or the stopping location, for computerized assist or autonomous driving of the vehicle for the driver or passenger.

2. The apparatus of claim 1, wherein request or retrieve comprises request a remote server for the one or more individual driving preferences, and receive from the remote server the one or more individual driving preferences.

3. The apparatus of claim 1, further comprising local storage coupled with the computerized assist or autonomous driving system, to store the one or more individual driving preferences, and wherein request or retrieve comprises retrieve, from the local storage, the one or more individual driving preferences.

4. The apparatus of claim 1, wherein the one or more policies further comprise a proxemic policy or an aggression policy; and wherein apply at least one of the one or more individual driving preferences of the driver or passenger to one or more policies comprises apply at least one of the one or more individual driving preferences of the driver or passenger to the proxemic policy or the aggression policy, to customize the proxemic policy or the aggression policy for computerized assist or autonomous driving of the vehicle for the driver or passenger.

5. The apparatus of claim 4, wherein the proxemic policy specifies an amount of distance to maintain from a vehicle in front; and wherein apply at least one of the one or more individual driving preferences of the driver or passenger to the proxemic policy comprises apply at least one of the one or more individual driving preferences of the driver or passenger to customize the amount of distance to maintain from a vehicle in front.

6. The apparatus of claim 4, wherein the aggression policy specifies a level of aggression for computerized assist or autonomously driving the vehicle; and wherein apply at least one of the one or more individual driving preferences of the driver or passenger to the aggression policy comprises apply at least one of the one or more individual driving preferences of the driver or passenger to customize the level of aggression for computerized assist or autonomously driving the vehicle.

7. The apparatus of claim 4, wherein the computerized assist or autonomous driving system is to also third receive a current location of the vehicle; wherein second receive comprises receive traffic volume, law enforcement, or crime data of the current location; and wherein assist or autonomously drive the vehicle comprises assist or autonomously drive the vehicle, based at least in part on the customized stop sign, proxemic or aggression policy, and the traffic volume, law enforcement, or crime data of the current location.

8. The apparatus of claim 7, wherein the computerized assist or autonomous driving system is to further determine a time of day; wherein the second receive comprises to receive the traffic volume, law enforcement, or crime data of the current location for the time of day.

9. The apparatus of claim 4, wherein the one or more policies further comprise a pedestrian policy; wherein the computerized assist or autonomous driving system is to also third receive a current location of the vehicle; wherein second receive comprises receive real time images of the current location of the vehicle; and wherein the computerized assist or autonomous driving system is to further process the real time images to determine whether one or more pedestrians are present at the current location.

10. An apparatus for computerized assist or autonomous driving of vehicles, comprising:
    one or more processors;
    an individual driving preference generator to be operated by the one or more processors to:
    receive a plurality of data associated with an individual driving a vehicle, or the individual being driven in a vehicle; and
    generate or update one or more individual driving preferences of the individual driving the vehicle, or the individual being driven in the vehicle, for application to customize one or more policies governing computerized assist or autonomous driving of a vehicle, for the individual as a driver or passenger of the vehicle, wherein generate or update is based at least in part on the data associated with the individual driving a vehicle, or the individual being driven in a vehicle received;
    wherein the one or more individual driving preferences are to be provided to a computerized assist or autonomous driving system of a vehicle for application to customize one or more driving policies governing computerized assist or autonomous driving of the vehicle;
    wherein the one or more policies comprise a stop sign policy that specifies a deceleration rate or a stopping location, when making a stop at a stop sign, and application of the one or more individual driving preferences comprises application of the one or more individual driving preferences to the stop sign policy to customize the deceleration rate or the stopping location, for computerized assist or autonomous driving of the vehicle.

11. The apparatus of claim 10, wherein the plurality of data associated with an individual driving a vehicle or an individual being driven in a vehicle, are respectively collected from multiple instances of the individual's operation of a vehicle simulator or multiple instances of operation of a vehicle simulator by a chauffer of the individual.

12. The apparatus of claim 10 further comprising storage coupled with the individual driving preference generator to store the individual driving preferences; wherein the storage is to output an individual driving preference for a vehicle, in response to a request for the individual driving preference by the vehicle; wherein the apparatus, including the individual driving preference generator and the storage, is remotely disposed from the vehicle.

13. The apparatus of claim 10, wherein the one or more policies further comprise a proxemic policy or an aggression policy governing computerized assist or autonomous driving of a vehicle; and wherein the one or more individual driving preferences are further employed to customize the proxemic policy or the aggression policy for computerized assist or autonomous driving of a vehicle for the individual as a driver or passenger.

14. The apparatus of claim 13, wherein the proxemic policy specifies an amount of distance to maintain from a vehicle in front; and wherein application of the one or more individual driving preferences of the driver or passenger to the proxemic policy comprises application of the one or more individual driving preferences of the driver or passenger to customize the amount of distance to maintain from a vehicle in front, or the aggression policy specifies a level of aggression for computerized assist or autonomously driving the vehicle; and wherein application of the one or more individual driving preferences of the driver or passenger to the aggression policy comprises application of the one or more individual driving preferences of the driver or passenger to customize the level of aggression for computerized assist or autonomously driving the vehicle.

15. A method for computerized assist or autonomous driving of vehicles, comprising:
   first receiving, by a computerized assist or autonomous driving system, an identifier identifying a driver or passenger of a vehicle;
   requesting or retrieving, by the computerized assist or autonomous driving system, using the identifier, one or more individual driving preferences of the driver or passenger;
   applying, by the computerized assist or autonomous driving system, at least one of the one or more individual driving preferences of the driver or passenger to one or more policies for computerized assist or autonomous driving of the vehicle, to customize the one or more policies for computerized assist or autonomous driving of the vehicle for the driver or passenger;
   second receiving a plurality of data for policy parameters of the one or more customized policies; and
   assisting or autonomously driving the vehicle, in a manner that is adapted for the driver or passenger, in accordance with the one or more customized policies, based at least in part on the plurality of data for the policy parameters of the one or more customized policies;
   wherein the one or more policies comprise a stop sign policy that specifies a deceleration rate or a stopping location, when making a stop at a stop sign, and applying at least one of the one or more individual driving preferences comprises applying at least one of the one or more individual driving preferences to the stop sign policy to customize the deceleration rate or the stopping location, for computerized assist or autonomous driving of the vehicle.

16. The method of claim 15, wherein the one or more policies further comprise a proxemic policy or an aggression policy; and wherein applying at least one of the one or more individual driving preferences of the driver or passenger to one or more policies comprises apply at least one of the one or more individual driving preferences of the driver or passenger to the proxemic policy or the aggression policy, to customize the proxemic policy or the aggression policy for computerized assist or autonomous driving of the vehicle for the driver or passenger.

17. A method for computerized assist or autonomous driving of vehicles, comprising:
   receiving, by an individual driving preference generator, a plurality of data associated with an individual driving a vehicle, or the individual being driven in a vehicle; and
   generating or updating, by the individual driving preference generator, one or more individual driving preferences for customization of one or more policies governing computerized assist or autonomous driving of a vehicle, for the individual as a driver or passenger of the vehicle, wherein generating or updating is based at least in part on the data associated with the individual driving a vehicle, or the individual being driven in a vehicle received;
   wherein the one or more individual driving preferences are to be provided to a computerized assist or autonomous driving system of a vehicle for application to customize one or more driving policies governing computerized assist or autonomous driving of the vehicle;
   wherein the one or more policies comprise a stop sign policy that specifies a deceleration rate or a stopping location, when making a stop at a stop sign, and application of the one or more individual driving preferences comprises application of the one or more individual driving preferences to the stop sign policy to customize the deceleration rate or the stopping location, for computerized assist or autonomous driving of the vehicle.

18. The method of claim 17, further comprising:
   storing, with a storage device, the individual driving preferences; and
   outputting, by the storage device, an individual driving preference for a vehicle, in response to a request for the individual driving preference by the vehicle;
   wherein generating, updating, storing and outputting are performed remotely from the vehicle.

19. At least one non-transitory computer readable storage media comprising a plurality of instructions configured to cause a computerized assist or autonomous driving system, in response to execution of the instructions by the computerized assist or autonomous driving system, to:
   first receive an identifier identifying a driver or passenger of a vehicle;
   request or retrieve, using the identifier, one or more individual driving preferences of the driver or passenger;
   apply at least one of the one or more individual driving preferences of the driver or passenger to one or more policies for computerized assist or autonomous driving of the vehicle, to customize the one or more policies for computerized assist or autonomous driving of the vehicle for the driver or passenger;

second receive a plurality of data for policy parameters of the one or more customized policies; and assist or autonomously drive the vehicle, in a manner that is adapted for the driver or passenger, in accordance with the one or more customized policies, based at least in part on the plurality of data for the policy parameters of the one or more customized policies;

wherein the one or more policies comprise a stop sign policy that specifies a deceleration rate or a stopping location, when making a stop at a stop sign, and apply at least one of the one or more individual driving preferences comprises apply at least one of the one or more individual driving preferences to the stop sign policy to customize the deceleration rate or the stopping location, for computerized assist or autonomous driving of the vehicle.

20. The at least one non-transitory computer readable storage media of claim 19, wherein the one or more policies further comprise a proxemic policy, or an aggression policy; and wherein applying at least one of the one or more individual driving preferences of the driver or passenger to one or more policies comprises apply at least one of the one or more individual driving preferences of the driver or passenger to the proxemic policy or the aggression policy, to customize the proxemic policy or the aggression policy for computerized assist or autonomous driving of the vehicle for the driver or passenger.

21. The at least one non-transitory computer readable storage media of claim 19, wherein first receive comprises first receive a plurality of individual driving preferences of a plurality of passengers, and the computerized assist or autonomous driving system is further caused to combine the corresponding plurality of individual driving preferences of the plurality of passengers; and wherein apply comprises apply the at least one of the combined individual driving preferences of the passengers to one or more policies for computerized assist or autonomous driving of the vehicle, to customize the one or more policies for computerized assist or autonomous driving of the vehicle for the passengers.

22. At least one non-transitory computer readable storage media comprising a plurality of instructions configured to cause an individual driving preference generator, in response to execution of the instructions by the individual driving preference generator, to:

receive a plurality of data associated with an individual driving a vehicle, or the individual being driven in a vehicle; and generate or update one or more individual driving preferences for customization of one or more policies governing computerized assist or autonomous driving of a vehicle, for the individual as a driver or passenger of the vehicle, wherein generate or update is based at least in part on the data associated with the individual driving a vehicle, or the individual being driven in a vehicle received;

wherein the one or more individual driving preferences are to be provided to a computerized assist or autonomous driving system of a vehicle for application to customize one or more driving policies governing computerized assist or autonomous driving of the vehicle;

wherein the one or more policies comprise a stop sign policy that specifies a deceleration rate or a stopping location, when making a stop at a stop sign, and application of the one or more individual driving preferences comprises application of the one or more individual driving preferences to the stop sign policy to customize the deceleration rate or the stopping location, for computerized assist or autonomous driving of the vehicle.

23. The at least one non-transitory computer readable storage media of claim 22, wherein the instructions, in response to execution, are to further cause:

storage of the individual driving preferences in a storage device; and output, from the storage device, an individual driving preference for a vehicle, in response to a request for the individual driving preference by the vehicle;

wherein generate, update, store and output are performed remotely from the vehicle.

* * * * *